United States Patent [19]
Rasmussen

[11] Patent Number: 5,984,353
[45] Date of Patent: Nov. 16, 1999

[54] QUICK-RELEASE ARRANGEMENT FOR A CAMPER JACK SYSTEM

[76] Inventor: C. Martin Rasmussen, 374 S. Sterling Dr., Fruit Heights, Utah 84037

[21] Appl. No.: 08/887,197

[22] Filed: Jul. 2, 1997

[51] Int. Cl.⁶ .................................. B60S 9/08; B60S 9/22
[52] U.S. Cl. ..................................... 280/766.1; 192/89.21; 192/69; 188/83; 254/424; 403/305; 403/383
[58] Field of Search .......................... 192/69, 108, 89.21; 188/83; 280/763.1, 766.1; 254/424, 425; 403/305, 383, 300, 409.1; 464/164, 169, 37, 38, 39; 74/575 R, 813 R

[56] References Cited

U.S. PATENT DOCUMENTS

| | | | |
|---|---|---|---|
| 981,113 | 1/1911 | Richards | 248/422 X |
| 1,039,960 | 10/1912 | Klein et al. | 254/103 |
| 1,275,971 | 8/1918 | Michelin | 254/103 X |
| 1,447,603 | 3/1923 | Runner | 254/103 X |
| 1,914,566 | 6/1933 | Haseltine | 192/69.91 |

(List continued on next page.)

FOREIGN PATENT DOCUMENTS

| | | | |
|---|---|---|---|
| 1088640 | 3/1957 | France | 254/103 |
| 1562197 | 4/1969 | France | 248/354.3 |

OTHER PUBLICATIONS

Atwood Industries, Inc. Product Brochure, Form No. BR–1043, 1992.
Atwood Industries, Inc. Product Brochure, Form No. TS–2000, 1993 (estimated).
Atwood Industries, Inc. Product Brochure, form No. TS–2002, 1993 (estimated).
Happijac Company Product Brochure, 1993 (estimated).
Rieco, Inc. Camper Jacks Product Brochure, 1980 (estimated).
Rieco, Inc. Swing–A–Way Bracket Product Brochure, 1980 (estimated).
Rieco, Inc. Ball Screw Camper Jacks Product Brochure, 1993 (estimated).
Rieco, Inc. Remote Controlled Electric Camper Jacks Product Brochure, 1993 (estimated).
Titan Jack, Inc. 4–Corner Camper Jack Product Brochure, 1993 (estimated).

*Primary Examiner*—J. J. Swann
*Assistant Examiner*—Andrew J. Ririe
*Attorney, Agent, or Firm*—Workman, Nydegger & Seeley

[57] ABSTRACT

The quick-release arrangement includes a coupler adapted to slidably engage a braked upper drive shaft and to slidably engage a lower drive shaft. The lower drive shaft is coupled to an associated jack leg such that when the upper drive shaft, the coupler, and the lower drive shaft are coupled together, the jack leg is braked. A spring urges the coupler into engagement with the lower drive shaft. A cam member supports the downwardly-biased coupler and permits the coupler to be cammed upward against the spring bias force such that the coupler slides along the upper drive shaft and, thus, out of engagement with the lower drive shaft. When it is desired to release the jack leg from the braking control of the upper drive shaft to thereby permit rapid lowering of the jack leg to the ground, a cam lever is used to easily overcome the spring bias force and effect camming. Inadvertent camming is prevented because the spring bias force is not overcome by normal vibration, jolting or jarring. Braking control of the upper drive shaft can be effected in various manners. For example, the upper drive shaft can be coupled to a motor that provides an inherent brake mechanism. Alternatively, a mechanical braking mechanism can provide braking control to the upper drive shaft such that operation of the cam member to disengage the upper drive shaft from the lower drive shaft releases the lower drive shaft from the braking control and permits the jack leg to be rapidly lowered to the ground. The present invention provides such a mechanical braking mechanism that cooperates with the quick-release arrangement for use when necessary or desired.

18 Claims, 5 Drawing Sheets

U.S. PATENT DOCUMENTS

| | | | |
|---|---|---|---|
| 2,201,826 | 5/1940 | Ditchfield | 248/200 |
| 2,477,466 | 7/1949 | Richardson | 403/384 X |
| 2,535,613 | 12/1950 | Vanderbeek | 248/188.4 |
| 2,583,923 | 1/1952 | Anschuetz . | |
| 3,080,185 | 3/1963 | Walker | 403/300 |
| 3,148,795 | 9/1964 | Leach | 254/45 X |
| 3,338,554 | 8/1967 | Gostomski | 254/45 X |
| 3,549,027 | 12/1970 | Batson | 214/38 |
| 3,567,271 | 3/1971 | Gostomski | 254/45 X |
| 3,592,443 | 7/1971 | Budrow | 254/420 |
| 3,640,502 | 2/1972 | Bargman, Jr. | 254/45 X |
| 3,709,467 | 1/1973 | Mann | 254/45 |
| 3,758,074 | 9/1973 | Jeffries et al. | 254/45 |
| 3,897,044 | 7/1975 | Tallman | 254/45 |
| 3,934,688 | 1/1976 | Sides | 192/48.5 |
| 4,015,822 | 4/1977 | Rasmussen | 254/45 |
| 4,169,581 | 10/1979 | Thurmond, Jr. | 254/45 |
| 4,316,601 | 2/1982 | Osborne | 254/424 |
| 4,723,931 | 2/1988 | Allen | 446/268 |
| 4,842,252 | 6/1989 | McMahan | 327/108 |
| 4,872,903 | 10/1989 | Periou | 74/89.15 |
| 4,930,270 | 6/1990 | Bevacqua | 248/357 X |
| 5,199,738 | 4/1993 | VanDenberg | 248/188.4 X |
| 5,273,256 | 12/1993 | Chambers | 254/45 |
| 5,553,825 | 9/1996 | Rasmussen | 248/354.3 |

QUICK-RELEASE ARRANGEMENT FOR A CAMPER JACK SYSTEM

BACKGROUND OF THE INVENTION

1. Technical Field

The present invention relates to camper jack systems used to raise, lower and/or level a discrete body such as a camper body and, particularly, those types of camper bodies that rest in the bed of a pickup truck. More particularly, the present invention relates to a quick-release arrangement for use with a camper jack system that permits the jack leg to be released from a braked position such that the jack leg can be rapidly lowered to the ground when desired. The present invention also relates to a cooperating mechanical brake mechanism for use with the quick-release arrangement, when necessary or desired.

2. Background Information

Camper jacks are commonly used to raise, lower and support camper bodies and are especially prevalent with those types of camper bodies which rest in the bed of a pick-up truck. Typically, camper jack systems of this type have an outer housing portion which is permanently mounted at each corner of the camper body. Disposed within the housing is a jack leg which can be extended or retracted in a telescoping fashion by operation of the jack's lifting mechanism. When the camper body is to be removed from the truck, each of the jack legs are extended, first, to the ground and, then, further so as to lift the camper body from the bed of the truck. The truck can then be driven out from beneath the camper body that is now supported by the extended jack legs. When the camper body is to be mounted upon the truck bed, the process is reversed, resulting in the jack legs being retracted within the housing such that the jack legs are well above the ground to provide ground clearance for the truck during travel.

There are currently available a wide variety of camper jack implementations. Typically, a camper jack system generates a lifting force by way of an elongated screw and nut mechanism. The screw is threaded through the nut that is non-rotatably attached to the jack leg telescopically received within the jack housing. When the screw is rotated, the nut travels upwardly or downwardly along the screw, thereby causing the jack leg to be retracted or extended relative to the jack housing. Directional rotation of the screw to thereby either extend or retract the jack leg is typically effected by rotation of a drive shaft coupled either directly or through a gearing assembly to the screw above the nut. Rotation of the drive shaft is effected by a driving mechanism which can be manual and typically comprises a hand cranking system, or can be powered, as by a hydraulic system or a power motor system, typically a battery-operated electric motor.

When the camper body is not in use, it is desirable for the jack legs to remain safely retracted within the jack housing. Moreover, when the truck carrying the camper body is travelling, it is essential that the jack legs remain retracted within the jack housings. An extended jack leg presents a very dangerous situation because it can catch upon the ground or some other object and result in damage not only to the camper jack system but also to the camper body, the truck and, worst of all, people in the vicinity and/or within the truck. Accordingly, it is desirable to have some means for safely locking each jack leg in the retracted position. On the other hand, when it is desired to extend the jack legs, the process of extending the jack legs to the ground is relatively time-consuming. Thus, it has been considered desirable to have some means for releasing each jack leg in a manner that permits rapid extension of the jack leg to the ground.

Both of these objectives have been addressed with various types of releasable locking means that rely on some type of latch having a notch and engaging pin arrangement. For example, U.S. Pat. No. 5,273,256 issued to Chambers, the entire disclosure of which is hereby incorporated herein by reference, discloses a releasable locking means for a manually-driven camper jack system which uses a low friction ball screw threaded through a ball nut that is non-rotatably attached to the jack leg telescopically received within the jack housing for extending and retracting the jack leg. The releasable locking means comprises a latch positioned within a sleeve wherein the sleeve protrudes from the gear assembly housing and surrounds a crankable shaft adapted to be telescoped within and coupled to a driving portion of a hand crank. The crankable shaft is coupled through the gear assembly to a second shaft coupled to the ball screw. The latch includes a collar which is slidably mounted on the crankable shaft and has radially extending and diametrically spaced ears which protrude through a corresponding pair of slots in the sleeve. The collar is formed with notches to receive a key in the form of an engaging pin extending radially through the crankable shaft. A spring is used to normally urge the engagement of the notches on the collar with the engaging pin to thereby prevent rotation of the crankable shaft and thereby lock the jack leg in the retracted position. To release the lock, the collar is slid along the crankable shaft in the direction of the spring such that the notches are disengaged from the engaging pin to thereby free the crankable shaft for rotation. By virtue of the low friction between the ball nut and ball screw, pushing downwardly on the base of the jack leg permits the ball screw, coupled to the freely rotatable crankable shaft, to freely rotate and rapidly lower the jack leg to the ground. To hold the collar in the unlocked position, a second pair of slots, slightly wider than the first pair, are formed on the sleeve immediately adjacent the first pair such that axially facing shoulders or detent surfaces are formed at the junction of each wide slot and each narrower slot. As the collar is slid along the crankable shaft in the direction of the spring, the ears are turned to engage the detent surfaces and thereby hold the collar in the unlocked position. An additional feature is an "automatic" release of the latch effected by placement of the driving portion of the hand crank in position to begin the cranking operation. As the driving portion of the hand crank is slid over the crankable shaft and coupled thereto, the driving portion contacts the collar within the sleeve and slides the collar toward the spring thereby disengaging the notches on the collar from the engaging pin and, thus, freeing the crankable shaft and screw for rotation. At this point, the jack leg can be rapidly lowered to the ground while the crank handle correspondingly freely rotates.

It will be appreciated that the mechanics of the above-described releasable locking means are relatively complex and require multiple interacting components. Both of these factors increase the cost and difficulty of manufacturing the releasable locking means and also may decrease the reliability and durability of the camper jack system. In addition, because the releasable locking means are automatically unlocked when the crank handle is inserted and thereby moves the latch notch out of engagement with the engaging pin, inadvertent release of a jack leg can occur when a person, e.g., a person unfamiliar with the arrangement, an inexperienced or, even, an experienced but inattentive person, inserts the crank handle without intending to release the jack leg. Another problem is that, because the crank handle is inserted against the spring bias force of the releasable locking means, it is necessary to continually apply pressure to keep the crank handle engaged and the lock released. If sufficient pressure is not applied, the crank handle is pushed outwardly by the spring and the lock "automatically" becomes re-engaged such that the entire maneuver of inserting the crank handle to release the lock must be repeated before the process of lowering of the jack leg to the ground can resume. Rather than permitting a simple, smooth and continuous lowering of the jack leg to the ground, the lowering process proceeds intermittently with cumbersome and annoying multiple repetitions of the lock release maneuver.

Other types of releasable locking means do not provide for automatic unlocking but, instead, require a separate manual operation to disengage the engaging pin from the latch notch. In these cases, however, cranking or otherwise operating the jack's lifting mechanism without first performing the manual unlocking operation to disengage the engaging pin from the latch notch can result in damage to one or more of the components of the camper jack system, e.g., shearing, bending, or otherwise breaking of either or both the engaging pin and the latch notch and/or damage to the lifting mechanism or other components of the camper jack system and may even result in injury to a person in the vicinity.

Another problem with known releasable locking means that rely on some type of latch having a notch and engaging pin arrangement is that inadvertent release of a jack leg can occur due to vibration and/or sudden jolts or jars to the camper jack system and, in particular, due to the vibration, bumping, and bouncing that occurs during travel of the truck, that unlocks the releasable locking means by causing disengagement of the latch notch and the engaging pin. As described previously, extension of a jack leg during travel of the truck is very dangerous and can result in damage not only to the camper jack system but also to the camper body, the truck and, worst of all, people in the vicinity and/or within the truck.

Accordingly, disadvantages of known releasable locking means that rely on some type of latch having a notch and engaging pin arrangement include the relatively complex mechanics requiring numerous interacting components, the need to repeat the automatic release maneuver, the possibility of damage and/or injury when the jack's lifting mechanism is operated without first releasing the locking means and the hazards related to inadvertent release of the jack leg and, particularly, inadvertent release caused by vibrations or jolts or jars during travel of the truck.

In view of the foregoing, it would be an advance to provide a simple, reliable, durable, and safe quick-release arrangement for a camper jack system that permits the jack legs to be released from a brake control such that the jack legs can be rapidly lowered to the ground. It would be a particular advance to provide a simple, reliable, durable, and safe quick-release arrangement for a camper jack system that is resistant to inadvertent release due to normal vibration and jolting and jarring and, especially, vibration and bouncing and bumping that occurs during travel of the truck equipped with the camper jack system. Another advance would be provided by a quick-release arrangement that is safe even in situations where an operator fails to properly engage or disengage the quick-release arrangement before operating the motor, or other driving mechanism, such that damage to the quick-release arrangement, the driving mechanism or other components of the camper jack system and/or injury to persons in the vicinity are prevented. It would also be an advance to provide such a quick-release arrangement that is mechanically simple and requires few interacting components and, thus, is relatively inexpensive and easy to manufacture.

Motorized camper jack systems have an inherent brake mechanism in that the motor is selectively operable in the forward and reverse directions and does not permit movement of the drive shaft in an opposite direction to the motor's directional setting. Thus, the motor's resistance to opposing movement acts as a brake to prevent the jack's lifting mechanism from operating in reverse until and unless such reverse operation is desired. In motorized camper jack systems it may be desired, and in non-motorized camper jack systems it is necessary, to have a brake mechanism to lock the jack leg in a retracted position. It will be appreciated that it would also be an advance to provide a cooperating mechanical brake mechanism for use with a quick-release arrangement, when necessary or desired.

SUMMARY OF THE INVENTION

The present invention has been developed in response to the present state of the art, and in particular, in response to the problems and needs in the art not heretofore fully or completely solved by currently available camper jack systems. Thus, it is an overall object of the present invention to provide a quick-release arrangement for a camper jack system that permits the jack legs to be released from a brake control, whether from a motor or a cooperating mechanical brake mechanism, such that the jack legs can be rapidly lowered to the ground and that is not subject to the problems that can be encountered with conventional quick-release means that rely on some type of latch having a notch and engaging pin arrangement. It is a further object of the present invention to provide a cooperating mechanical brake mechanism for use with the quick-release arrangement, when necessary or desired.

It is an object of the present invention to provide a simple, reliable, durable, and safe quick-release arrangement for a camper jack system that permits the jack leg to be released from a locked position such that the jack legs can be rapidly lowered to the ground. It is a further object to provide such a quick-release arrangement that is resistant to inadvertent release due to normal vibration and jolting and jarring and, especially, the normal vibration and bouncing and bumping that occurs during travel of the truck equipped with the camper jack system.

Yet another object of the present invention is to provide a quick-release arrangement that is safe even in situations where an operator fails to properly and/or fully engage or disengage the quick-release arrangement before operating the motor, or other driving mechanism, such that damage to the quick-release arrangement, the driving mechanism or other components of the camper jack system and/or injury to persons in the vicinity are prevented.

Another object of the present invention is to provide a quick-release arrangement that is mechanically simple and requires few interacting components and, thus, is relatively inexpensive and easy to manufacture.

It is also an object of the present invention to provide a quick-release arrangement that is reliable and durable.

Still another object of the present invention is to provide a cooperating mechanical brake mechanism for use with the quick-release arrangement, when necessary or desired.

Additional objects and advantages of the present invention will become more fully apparent from the following more detailed description taken in conjunction with the drawings and claims, or may be learned by the practice of the invention.

Briefly summarized, the foregoing and other objects are achieved with the novel safe quick-release arrangement for a camper jack system of the present invention. The quick-release arrangement of the present invention is mechanically simple and requires only a few interacting components and is also inexpensive to manufacture, reliable, and durable. The quick-release arrangement includes a coupler adapted to slidably engage an upper drive shaft and to slidably engage a lower drive shaft. A spring urges the coupler, engaged with the upper drive shaft, into engagement with the lower drive shaft. The lower drive shaft is coupled to an associated lead screw to thereby retract or extend an associated jack leg, depending on the direction of rotation of the lower drive shaft. The upper drive shaft is braked such that when the upper drive shaft, the coupler, and the lower drive shaft are engaged with each other, the jack leg is braked.

In accord with the present invention, release of the braking control on the lower drive shaft due to being coupled to the braked upper drive shaft is achieved with a cam member pivotally supported within the jack housing and supporting the downwardly-biased coupler. The cam member is configured to permit the coupler to be cammed upward against the spring bias force such that the coupler slides along the upper drive shaft and, thus, slides out of engagement with the lower drive shaft. In this manner, operation of the cam member to cam the coupler upwardly effects uncoupling of the upper drive shaft from the lower drive shaft to thereby release the lower drive shaft from the braked upper drive shaft such that the lower drive shaft and the associated lead screw are free to rotate. At this point, the jack leg can be easily and rapidly lowered to the ground under a lowering force such as gravity alone or a minimal force applied to the jack leg, e.g., by a person's hand or foot.

The quick-release arrangement of the present invention is very safe. Because the coupler is biased by the spring to remain engaged with the lower drive shaft, the spring bias force must be overcome by the pivoting cam member to effect camming, i.e., disengagement of the lower drive shaft from the coupler and, thus, from the upper drive shaft. When it is desired to release the jack leg for rapid lowering to the ground, a cam lever is used to easily overcome the spring bias force and effect camming. Inadvertent release, i.e., inadvertent camming, due to normal vibration and jolting and jarring and, especially, the normal vibration and bouncing and bumping that occurs during travel of the truck equipped with the camper jack system, is prevented because the spring bias force is not overcome by these occurrences.

If the driving mechanism of the camper jack system is coupled to the upper drive shaft, operation of the cam member disengages the upper drive shaft from the lower drive shaft to thereby also disengage the driving mechanism. On the other hand, if the driving mechanism of the camper jack system is coupled to the lower drive shaft, operation of the cam member permits the lower drive shaft to be driven while the upper drive shaft remains braked. Similarly, braking control of the upper drive shaft can be effected in various manners.

For example, the upper drive shaft can be coupled to the motor in a motorized camper jack system which provides an inherent brake mechanism. Accordingly, an exemplary use of the quick-release arrangement of the present invention is in a camper jack system having the motor coupled to the upper drive shaft wherein the motor provides both driving and braking control of the jack leg. In such a camper jack system, operation of the cam member to disengage the upper drive shaft from the lower drive shaft releases the lower drive shaft from the braking control of the motor and permits the jack leg to be rapidly lowered to the ground. Operation of the cam member also disengages the driving control of the motor so that operation of the motor when the coupler is cammed will not drive the lower drive shaft or the jack leg. In this manner, no damage occurs to any of the components of the camper jack system when the motor is operated with the cam member cammed, however, the operator is made aware that the cam member has not been uncammed by the failure of the jack leg to be driven by the motor.

Alternatively, a mechanical braking mechanism can provide braking control to the upper drive shaft such that operation of the cam member to disengage the upper drive shaft from the lower drive shaft releases the lower drive shaft from the braking control and permits the jack leg to be rapidly lowered to the ground. The present invention provides such a mechanical braking mechanism that cooperates with the quick-release arrangement. The mechanical braking mechanism comprises a differentially rotatable cog assembly coupled to the upper drive shaft and adapted to prevent rotation of the upper drive shaft. The differentially rotatable cog assembly is adapted to remain stationary and to thereby brake the upper drive shaft until a selected force, sufficient to effect rotation of the differentially rotatable cog assembly, is applied to the differentially rotatable cog assembly. In particular, the thickness and, thus, the strength and resilience of the plastic material used in the differentially rotatable cog assembly, is adjusted to be resistant to rotation up to a selected force and then to be rotatable when the force exceeds the selected force. Preferably, the selected force is about 300 lbs. In this manner, inadvertent movement of the jack leg caused by a force from an external body, such as a person or a part of the camper or truck applied to the jack leg when the upper drive shaft, braked by the differentially rotatable cog assembly, is coupled to the lower drive shaft, will not occur until the force applied exceeds about 300 lbs. It will be appreciated that even higher forces can be selected, if desired. The force generated by the driving mechanism, however, will exceed the selected force such that the differentially rotatable cog assembly can be rotated when the driving mechanism is operated to drive the lower drive shaft. In this manner, no damage will occur to any of the components of the mechanical braking mechanism or the quick-release arrangement when the driving mechanism is operated while the upper drive shaft and the lower drive shaft are coupled.

An exemplary use of the quick-release arrangement used with the cooperating differentially rotatable cog assembly to provide braking control to an upper drive shaft is in a camper jack system having a manual driving mechanism comprising a hand cranking system that is coupled to the lower drive shaft. As described above, operation of the cam member to disengage the upper drive shaft from the lower drive shaft releases the lower drive shaft from the braking control exerted by the differentially rotatable cog assembly and permits the jack leg to be rapidly lowered to the ground. Operation of the cam member also permits the lower drive shaft to be driven by the hand cranking system while the upper drive shaft remains braked by the differentially rotatable cog assembly. Because the differentially rotatable cog assembly is adapted to withstand a selected force, preferably a force of up to about 300 lbs., the upper drive shaft remains braked during normal vibration and jolting and jarring and, especially, the normal vibration and bouncing and bumping that occurs during travel of the truck equipped with the camper jack system. In addition, because the cog assembly can be caused to rotate when a force greater than the selected force is applied to the upper drive shaft, operation of the hand cranking system generates sufficient rotating force upon the lower drive shaft and, thus, upon the upper drive shaft coupled through the coupler to the lower drive shaft, to overcome the resistance of the differentially rotatable cog assembly such that the cog rotates along with the coupled upper and lower drive shafts rotate. Thus, hand cranking to raise and/or lower the jack leg readily generates sufficient force to rotate the differentially rotatable cog assembly without any damage occurring to any of the components of the mechanical braking mechanism or the quick-release arrangement. Moreover, when quick release of the jack leg is desired and the operator fails to fully and properly operate the cam member to release the braking control before operating the hand crank, the rotation of the still-engaged differentially rotatable cog assembly results in some discernible resistance to cranking and also an audible clicking noise such that the operator is made aware that the upper drive shaft is still engaged with the lower drive shaft through the coupler.

The quick-release arrangement of the present invention can perform dual functions in a camper jack system that has a driving mechanism, such as a motor, coupled to the upper drive shaft, and an optional driving mechanism, such as a hand cranking system, coupled to the lower drive shaft. In this type of camper jack system, the quick-release arrangement effects release of the jack leg from the braking control of the motor to permit rapid lowering of the jack leg to the ground and the quick-release arrangement also permits the motor to be disengaged from driving control of the lower drive shaft such that the optional manual cranking system can be used to drive the lower drive shaft when that is desired.

BRIEF DESCRIPTION OF THE DRAWINGS

In order to more fully understand the manner in which the above-recited and other advantages and objects of the invention are obtained, a more particular description of the invention will be rendered by reference to specific embodiments thereof which are illustrated in the appended drawings. Understanding that these drawings depict only typical embodiments of the invention and are therefore not to be considered limiting of its scope, the invention in its presently understood best mode for making and using the same will be described with additional specificity and detail through the use of the accompanying drawings in which.

DETAILED DESCRIPTION OF THE PREFERRED EMBODIMENT

Figure 1:
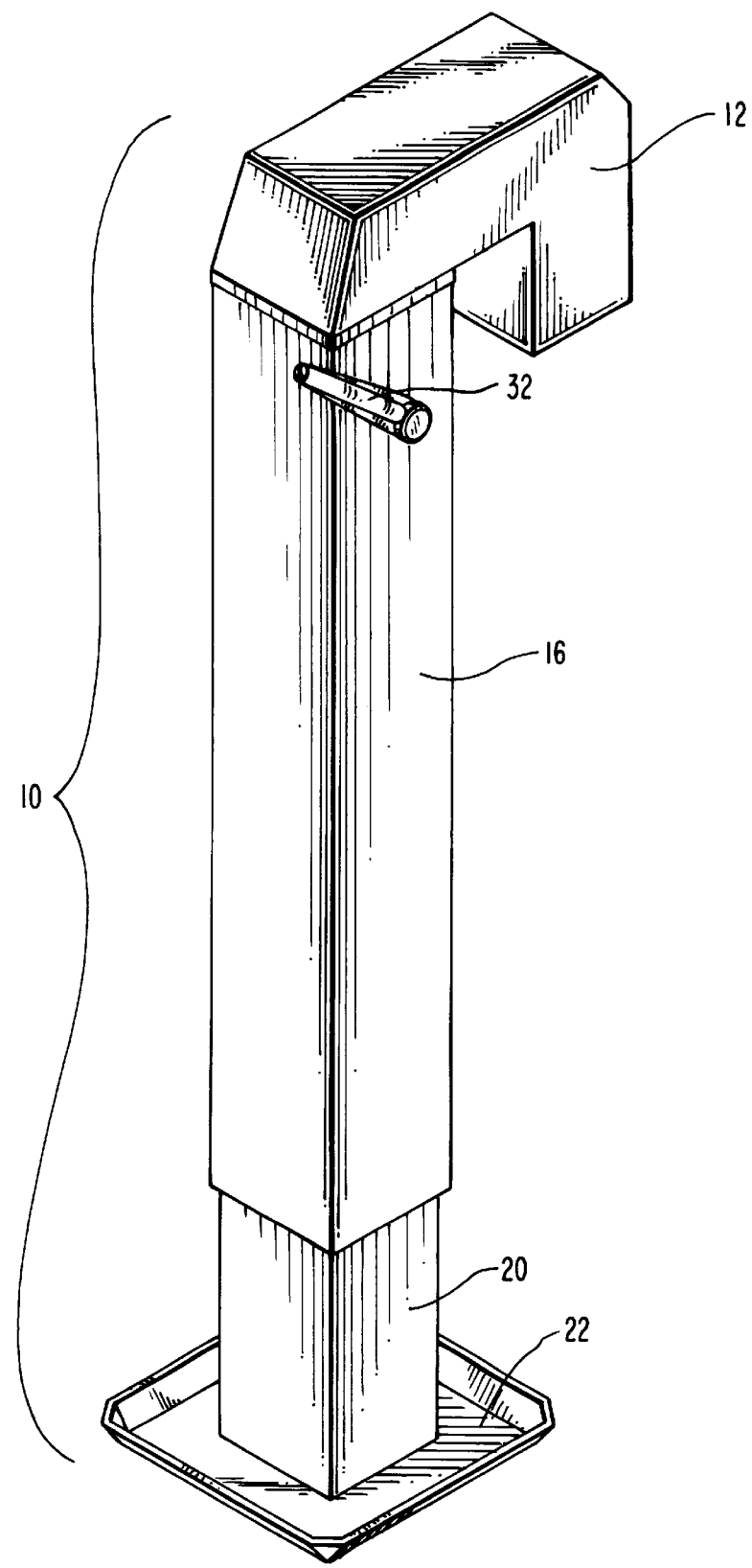
FIG. 1 is a perspective view of a motorized camper jack system equipped with a quick-release arrangement in accord with the present invention.

As described in the background section, typical camper jack systems have an outer housing portion which is permanently mounted at each corner of the camper body. Disposed within the housing is a jack leg which can be extended or retracted in a telescoping fashion by operation of the jack's lifting mechanism. The lifting force is generated by way of an elongated screw and nut mechanism wherein the screw is threaded through the nut that is non-rotatably attached to the jack leg telescopically received within the jack housing. When the screw is rotated, the nut travels upwardly or downwardly along the screw, thereby causing the jack leg to be retracted or extended relative to the jack housing.

Directional rotation of the screw to thereby either extend or retract the jack leg is typically effected by rotation of a drive shaft coupled either directly or through a gearing assembly to the screw above the nut. Rotation of the drive shaft is effected by a driving mechanism which can be manual and typically comprises a hand cranking system, or can be powered, as by a hydraulic system or a power motor system, typically a battery-operated electric motor. Because the process of extending the jack legs to the ground is relatively time-consuming, means for releasing each jack leg in a manner that permits rapid extension of the jack leg to the ground are desirable.

The present invention has been developed in response to the present state of the art, and in particular, in response to the problems and needs in the art not heretofore fully or completely solved by currently available camper jack systems. Thus, the present invention provides a quick-release arrangement for a camper jack system that permits the jack legs to be released from a brake control, whether from a motor or a cooperating mechanical brake mechanism, such that the jack legs can be rapidly lowered to the ground and that is not subject to the problems that can be encountered with conventional quick-release means that rely on some type of latch having a notch and engaging pin arrangement.

Braking control of the jack leg can be effected in various manners. For example, the motor in a motorized camper jack system provides an inherent braking mechanism. Alternatively, a mechanical braking mechanism can provide braking control of the jack leg. Accordingly, the present invention also provides a cooperating mechanical brake mechanism for use with the quick-release arrangement, when necessary or desired.

For illustrative purposes, the quick-release arrangement of the present invention is described in relation to a motorized camper jack system. It will be appreciated that the quick-release arrangement of the present invention could also be utilized in camper jack systems that are not motorized but use some other driving mechanism, e.g., a manual crank system or a hydraulic system, to rotate a drive shaft coupled to the elongated screw and nut mechanism for extending and retracting the jack leg. Motorized camper jack systems have an inherent braking means in that the motor is selectively operable in the forward and reverse directions and does not permit movement of the drive shaft in an opposite direction to the motor's directional setting. Thus, the motor's resistance to opposing movement acts as a brake to prevent the jack's lifting mechanism from operating in reverse until and unless such reverse operation is desired. In accord with the present invention, the quick-release arrangement permits the jack leg to be released from the braking control of the motor such that the jack leg can be rapidly lowered to the ground when desired.

It will be appreciated that, while a motor provides an inherent braking mechanism, no such inherent braking mechanism is available in non-motorized camper jack systems. Thus, in non-motorized camper jack systems it is necessary, to have a brake mechanism to lock the jack leg in a retracted position. For this reason, the present invention also relates to a cooperating mechanical brake mechanism for use with the quick-release arrangement, when necessary or desired.

Referring now to FIG. 1, a motorized camper jack system 10 in accord with the present invention is illustrated in a perspective view. The motorized camper jack system 10 includes an exterior jack housing 16, which is adapted to mount to a camper body, for example, by way of a bracket (not shown). Telescoping slidably into the jack housing 16 is an elongate, hollow jack leg 20, shown in a partially extended position. Affixed to the lower end of the jack leg 20 is a base plate 22 for engaging the ground. Although the jack housing and telescoping jack leg are illustrated as being substantially square-shaped, it will be appreciated that these and other elements of a motorized camper jack system could have different configurations, if desired. A motor in a motor housing 12, is used to effect extension and retraction of the jack leg. In the perspective view of FIG. 1, the cam lever 32 is the only component of the quick-release arrangement that is visible.

In use, a camper jack system is positioned at each corner of a camper body that is mounted upon a truck bed. When the camper body is positioned within the truck bed, the jack leg of each camper jack system is positioned a sufficient distance above the ground to provide clearance during travel of the truck. When the camper body is to be removed from the truck, the driving mechanism is operated to lower the jack leg relative to the jack housing until the base plate contacts the ground. Thereafter, continued operation of the driving mechanism applies a downward force against the jack leg so as to cause the jack housing to move upwardly relative to the jack leg and thereby lift the camper body from the truck bed. When all four jack legs are extended in this manner, the camper body is completely supported by the series of camper jack systems such that the truck can be driven out from underneath the camper body. When the camper body is to be remounted to the truck bed, the process is reversed.

Figure 2:
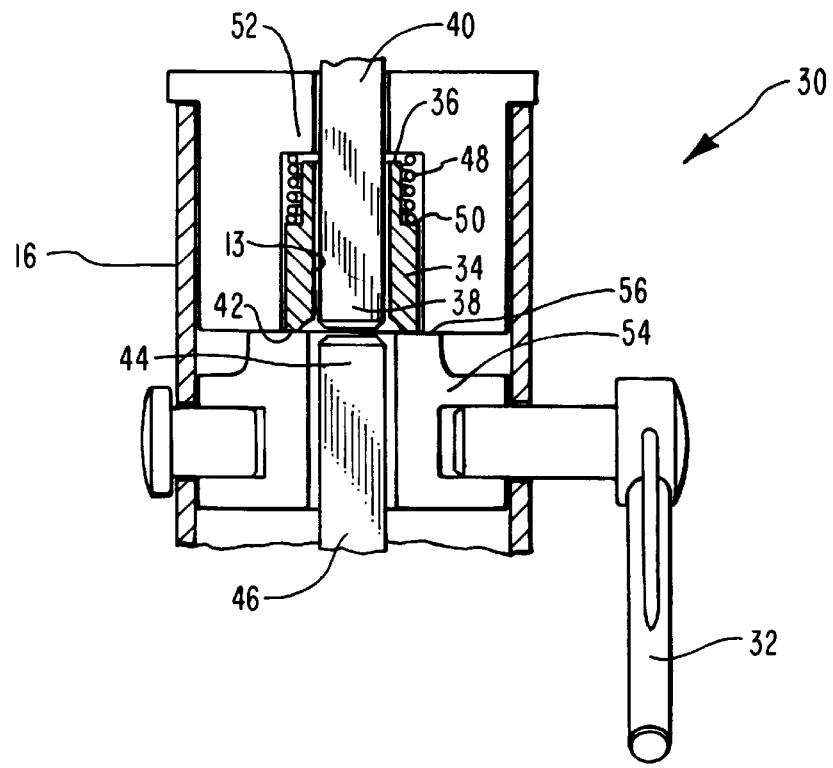
FIG. 2 illustrates a cross-section view of a preferred quick-release arrangement having the cam member in the cammed orientation.
Figure 3:
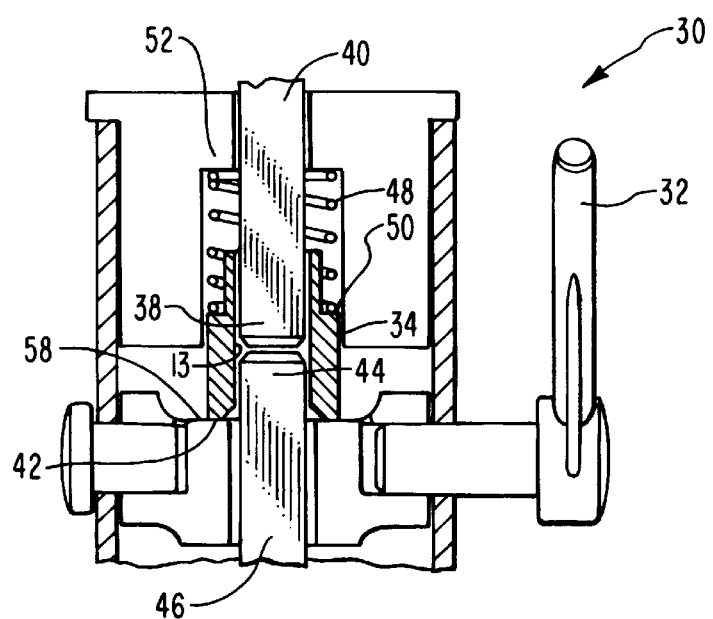
FIG. 3 illustrates a cross-section view of a preferred quick-release arrangement having the cam member in the uncammed orientation.

A portion of the motorized camper jack system shown in FIG. 1 is illustrated in FIGS. 2 and 3 in cross-section views to illustrate a preferred embodiment of the quick-release arrangement 30. A coupler 34 having a bore 13 therethrough is adapted at a top end 36 to slidably engage a lower end 38 of an upper drive shaft 40.

Figure 8:
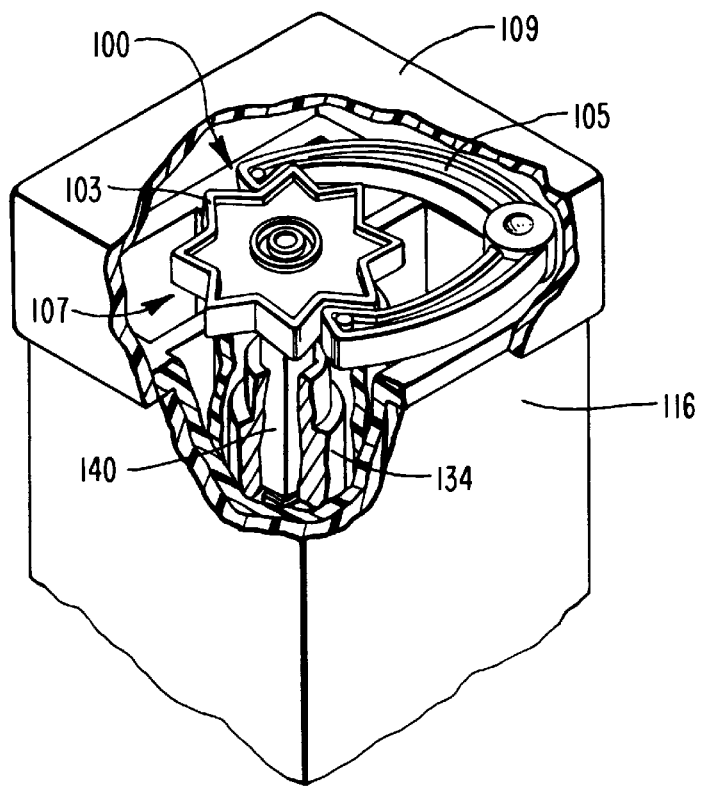
FIG. 8 illustrates a perspective cut-away view of a preferred cooperating mechanical braking mechanism of the present invention.

The upper drive shaft 40 is rotatable on its longitudinal axis but is fixed against vertical movement within the jack housing 16. The upper drive shaft 40 extends a short distance upwardly from the coupler 34 and passes through an opening surrounded by a stationary flange 52 into a compartment for coupling with the motor in the motor housing 12 (shown in FIG. 1) such that the upper drive shaft 40 is directionally rotated by the motor. As described above, directional driving of the coupled drive shafts, in turn, typically effects directional rotation of an associated lead screw (not shown) through a gearing assembly (not shown) to thereby retract or extend the jack leg (shown in FIG. 1), depending on the direction of rotation. Because the motor resists movement in an opposite direction to the motor's directional setting, the motor provides brake control as well as driving control of the coupled drive shafts. (As mentioned above, in a non-motorized camper jack system or a camper jack system having the driving mechanism coupled to the lower drive shaft, braking control of the upper drive shaft must be provided in another manner. A preferred embodiment of a mechanical braking mechanism for coupling to the upper drive shaft that cooperates with the quick-release arrangement is illustrated in FIG. 8.)

The coupler 34 has a bottom end 42 adapted to slidably engage an upper end 44 of a lower drive shaft 46. The lower drive shaft 46 is also rotatable on its longitudinal axis but is fixed against vertical movement within the jack housing 16. The coupler 34 is configured to securely engage the upper drive shaft 40 and the lower drive shaft 46 such that, when coupled, the upper drive shaft 40, the coupler 34, and the lower drive shaft 46 rotate together through operation of the motor. At the same time, the coupler 34 is adapted to slide up and down along the longitudinal axis of the upper drive shaft 40 and the lower drive shaft 46.

Figure 4:
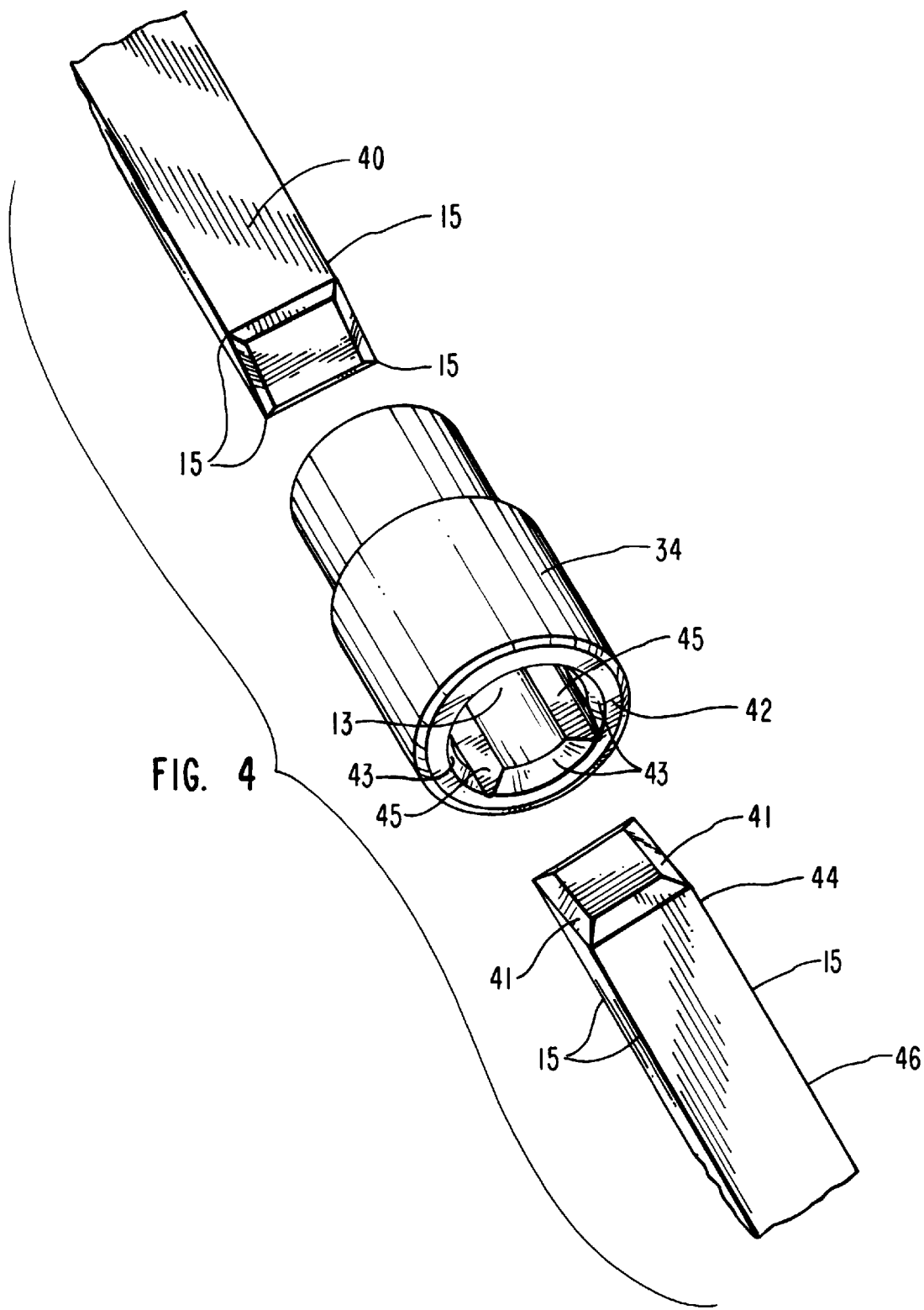
FIG. 4 is an exploded view of a portion of a preferred quick-release arrangement.

It will be appreciated that various means for effecting the slidable engagement of the coupler 34 and the upper and lower drive shafts 40 and 46, respectively, could be used. For example, as shown in FIG. 4, the bore 13 through the coupler 34 is preferably configured to have notched corners 45 to thereby engage the corners 15 of the substantially square-shaped upper and lower drive shafts 40 and 46, respectively, such that coupled rotation will occur while still permitting the coupler 34 to slide up and down along the longitudinal axes of upper drive shaft 40 and lower drive shaft 46. To withstand the torque generated by operation of the motor, the coupler 34 is preferably constructed of a strong and durable metal material. In non-motorized camper jack systems which do not generate as much torque, a very strong plastic or nylon material could be used, if desired. In addition to the notched corners 45 within the bore 13 of the coupler 34, the upper end 44 of the lower drive shaft 46 is preferably configured to have bevelled edges 41 that correspond to bevelled edges 43 formed on the bottom end 42 of the coupler 34 such that slidable engagement of the coupler 34 and the lower drive shaft 46 is facilitated.

A spring 48 is positioned to bias the coupler 34 downward and into engagement with the lower drive shaft 46. It will be appreciated that various means for effecting the spring bias force could be used. In the illustrated embodiment shown in FIGS. 2 and 3, flange 52 forms the stop for a top end of the spring 48 while a protruding shoulder 50 formed on the coupler 34 forms a stop for the bottom end of the spring. The downwardly-biased coupler 34, in turn, is stopped by a cam member 54 pivotally supported within the jack housing 16 and connected to the cam lever 32 on the outside of the jack housing 16.

Figure 5:
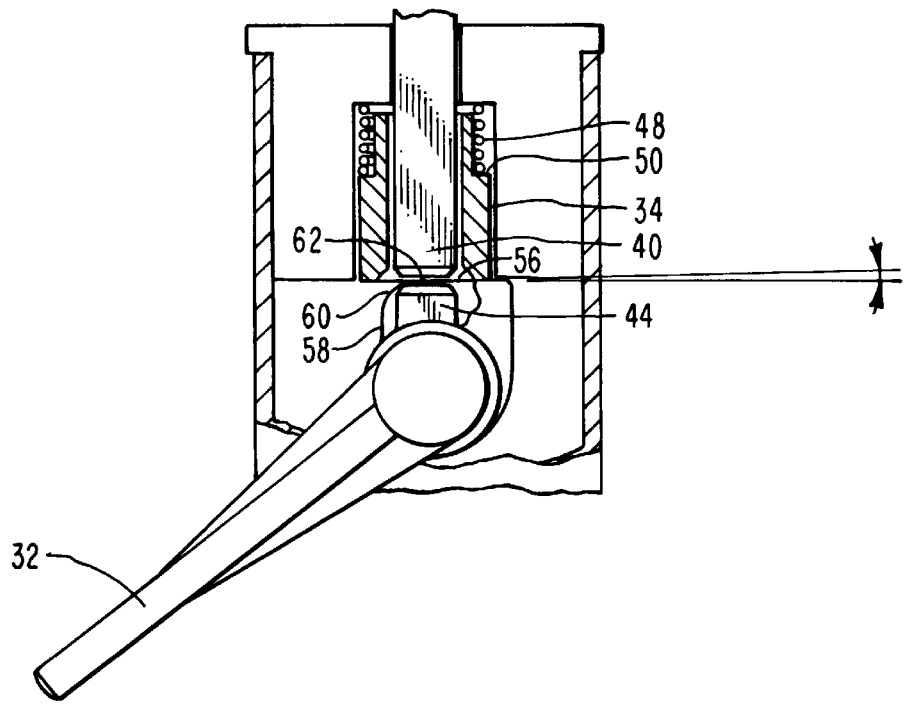
FIG. 5 illustrates the relative positions of the cam member and the upper end of the lower drive shaft in the cammed orientation.
Figure 6:
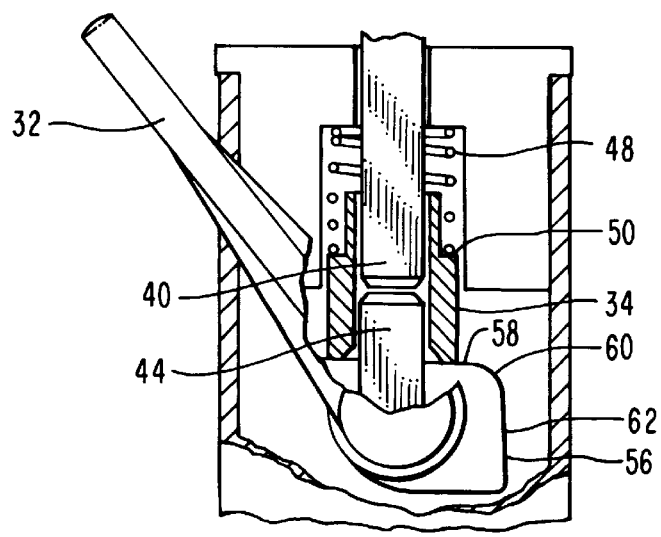
FIG. 6 illustrates the relative positions of the cam member and the upper end of the lower drive shaft in the uncammed orientation.

Cam member 54 is illustrated in the cammed orientation in FIG. 2 and in the uncammed orientation in FIG. 3. FIGS. 5 and 6 show the relative positions of the cam member 54 and the upper end 44 of the lower drive shaft 46 in, respectively, the cammed orientation and the uncammed orientation. The relative position of the cam lever 32 on the outside of the jack housing 16 is also illustrated in FIGS. 5 and 6.

As shown in FIGS. 2 and 5, when the cam member 54 is pivoted approximately 90° into the cammed orientation, cam surface 56 is rotated upwardly as the support surface 58

(FIG. 5) is rotated downwardly. Because the cam surface 56 is farther than the support surface 58 from the axis of rotation of the cam member 54, as the cam member 54 pivots, the cam surface 56 forces the downwardly-biased coupler 34 to be cammed upwardly against the spring bias force and made to slide along the upper drive shaft 40 and, thus, to slide out of engagement with the lower drive shaft 46. As shown in FIGS. 2 and 5, the cam surface 56 ends up supporting the coupler 34 at a position slightly above the upper end 44 of the lower drive shaft 46. In this manner, when the jack leg 20 (FIG. 1) is in a retracted position, operation of the cam lever 32 to pivot the cam member 54 into the cammed orientation effects uncoupling of the lower drive shaft 46 from the upper drive shaft 40 and, thus, releases the lower drive shaft from the control of the motor such that the lower drive shaft 46 and the associated lead screw are free to rotate. At this point, the jack leg 20 (FIG. 1) can be easily and rapidly lowered to the ground under a lowering force such as gravity alone or a minimal force applied to the jack leg 20, e.g., by a person's hand or foot.

The cam member 54 is configured to partially encircle the lower drive shaft 46 in both the cammed and uncammed orientation. When uncammed, a support surface 58 of the cam member 54 is located slightly below the upper end 44 of the lower drive shaft 46 (FIGS. 3 and 6) such that the downwardly-biased coupler 34 is supported in the engaged position with the lower drive shaft 46. Thus, when the cam member 54 is uncammed, the spring bias force normally effects coupling of the upper drive shaft 40 and the lower drive shaft 46 through the coupler 34 such that both the upper drive shaft 40 and the lower drive shaft 46 are directionally driven, i.e., selectively rotated in a forward or reverse direction, by the motor.

Because the coupler 34 is biased by the spring 48 to remain engaged with the lower drive shaft 46, the spring bias force must be overcome by the pivoting cam member 54 to effect camming, i.e., disengagement of the lower drive shaft from the coupler. When the jack leg 20 (FIG. 1) is in the retracted position and the camper body is resting in the truck bed, the cam lever 32 is easily pivoted against the spring bias force and the jack leg 20 is thereby released for rapid lowering to the ground. The spring tension is adjusted as, for example, by selecting the thickness and flexibility of the spring material, to ensure that inadvertent release, i.e., inadvertent camming, due to normal vibration and jolting and jarring and, especially, the normal vibration and bouncing and bumping that occurs during travel of the truck equipped with the camper jack system 10, is prevented because the spring bias force is not overcome by these occurrences. On the other hand, when the cam member 54 is in the cammed orientation (FIG. 5), there is a slightly increased downward force on the cam surface 58 applied by the spring 48 that has tightened as the coupler 34 was cammed upwardly. The cam member 54 must be constructed to securely support the coupler 34 in the cammed orientation.

As best shown in FIGS. 5 and 6, the cam member 54 is preferably configured to have a rounded edge 60 between the support surface 58 and cam surface 56 and the surfaces are preferably smooth and just slightly resilient to permit the cam member to smoothly pivot along the bottom end 42 of the coupler 34. Suitable materials, e.g., moldable nylon and plastic materials, are known in the art. Cam member 54 is preferably constructed from a very strong but resilient nylon or plastic material. A preferred product is the plastic known as DELRIN, a product of E.I. du Pont de Nemours & Co., Inc. In addition, this material and similar materials are readily available, moldable, durable and inexpensive. As best shown in FIG. 5, the cam surface 56 is preferably configured to have a slight slope 62 downward toward the rounded edge 60 between the cam surface 56 and the support surface 58. If the cam lever 32 is operated only partially, the downward force of the coupler upon the sloped surface of the cam surface 56 will tend to cause the cam member 54 to "flip" back into the uncammed orientation. In this manner, the cam member 54 is prevented from resting in a relatively unsafe position that is between the fully cammed orientation and the fully uncammed orientation. When the cam lever 32 is operated fully, however, the cam member 54 is very securely positioned in the cammed orientation.

Figure 7:
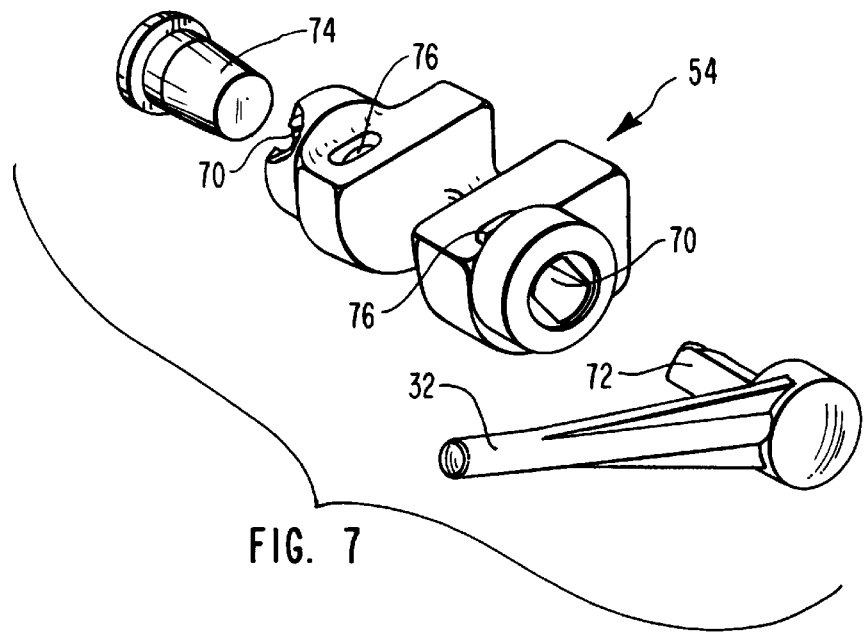
FIG. 7 is an exploded view of a preferred embodiment of a cam member adapted to be added to an existing camper jack system.

It will be appreciated that various means for pivotally supporting the cam member 54 within the jack housing 16 could be used. As shown in FIG. 7, in a preferred embodiment, the cam member 54 is adapted to be added to an existing camper jack system. The cam member 54 is formed with receiving holes 70 for securely receiving a connecting end 72 of the cam lever 32 on one side and a bolt-type connector 74 on the opposite side, preferably made of a sturdy smooth material such as hard nylon or plastic. It will be appreciated that holes can be provided or can be made in the jack housing of a camper jack system to correspond to the receiving holes 70 and the cam member 54 can then be positioned within the jack housing 16 with the receiving holes 70 aligned with the holes in the jack housing 16. The bolt-type connector 74 and the connecting end 72 of the cam lever 32 are passed through the holes in the jack housing and into the respective receiving holes 70 to thereby provide the pivotally supported cam member 54 of the quick-release arrangement. In addition, for ease of removal of the cam member 54, small access holes 76 are preferably provided within the cam member 54 to connect with the receiving holes 70 in a manner that permits the tip of a screwdriver or other small object to be inserted into the access holes 76 such that the connecting end of the cam lever 32 or the bolt-type connector 74 can be pushed out of engagement with the respective receiving hole 70. A preferred material for the cam lever 32 and the bolt-type connector 74 is a strong but resilient nylon or plastic material.

The quick-release arrangement of the present invention is very safe. Because the coupler 34 is biased by the spring 48 to remain engaged with the lower drive shaft 46, the spring bias force must be overcome by the pivoting cam member 54 to effect camming, i.e., disengagement of the lower drive shaft 46 from the coupler 34. When it is desired to release the jack leg 16 for rapid lowering to the ground, the cam lever 32 is used to easily overcome the spring bias force and effect camming. Inadvertent release, i.e., inadvertent camming, due to normal vibration and jolting and jarring and, especially, the normal vibration and bouncing and bumping that occurs during travel of the truck equipped with the camper jack system 10, is prevented because the spring bias force is not overcome by these occurrences.

In addition, when the driving mechanism of the camper jack system 10 is coupled to the upper drive shaft 40, the cam member 54 should only be cammed during the period of time when the jack leg 20 is being lowered to the ground. Once the jack leg 20 nears or contacts the ground, the cam member 54 should be pivoted by the cam lever 32 into the uncammed orientation to engage the upper and lower drive shafts 40 and 46, respectively and permit operation of the motor (or other driving mechanism) to effect lifting of the camper body. Because operation of the cam member 54 also disengages the driving control of the lower drive shaft 46, however, no damage occurs from operation of the driving mechanism with the cam member 54 in the cammed orientation. Rather, the upper drive shaft 40 is driven to rotate but, because the upper drive shaft 40 is not coupled to the lower drive shaft 46, the lower drive shaft 46 does not rotate. Thus, the operator is made aware that the cam member 54 has not been uncammed by the failure of the jack leg 20 to be driven.

As previously mentioned, in non-motorized camper jack systems or in camper jack systems having the driving mechanism coupled to the lower drive shaft, braking control of the upper drive shaft must be provided in another manner. One alternative is a mechanical braking mechanism to provide braking control to the upper drive shaft such that operation of the cam member to disengage the upper drive shaft from the lower drive shaft releases the lower drive shaft from the braking control and permits the jack leg to be rapidly lowered to the ground. As shown in FIG. 8, the present invention provides such a mechanical braking mechanism that cooperates with the quick-release arrangement, when necessary or desired. An exemplary use of the quick-release arrangement used with the cooperating mechanical braking mechanism to provide braking control to an upper drive shaft is in a camper jack system having a manual driving mechanism, e.g., a hand cranking system, that is coupled through a gearing assembly to a lower drive shaft that is coupled, in turn, to the screw such that manual cranking effects extension and retraction of the jack leg.

Referring to FIG. 8, a preferred embodiment of a mechanical braking mechanism for coupling to the upper drive shaft to thereby cooperate with the quick-release arrangement is illustrated. The mechanical braking mechanism preferably comprises a differentially rotatable cog assembly 100 coupled to or, preferably, integral with, the upper drive shaft 140 and adapted to prevent rotation of the upper drive shaft. The differentially rotatable cog assembly 100 is adapted to remain stationary and to thereby brake the upper drive shaft 140 until a selected force, sufficient to effect rotation of the differentially rotatable cog assembly 100, is applied to the differentially rotatable cog assembly 100 through the upper drive shaft 140. Preferably, the selected force is about 300 lbs. In this manner, inadvertent movement of the jack leg 20 (FIG. 1) caused by a force from an external body, such as a person or a part of the camper or truck, applied to the jack leg 20 when the upper drive shaft is coupled to the lower drive shaft, will not occur until the force applied exceeds about 300 lbs.

As described with respect to FIGS. 2, 3, 5 and 6, the upper drive shaft 140 extends a short distance upwardly from the coupler 134 and passes through an opening surrounded by a stationary flange (not shown) into a compartment 107 enclosing the differentially rotatable cog assembly 100. The differentially rotatable cog assembly 100 comprises a generally star-shaped cog 103 engaged with a generally wishbone-shaped pinion 105. Because the cog 103 is connected to the upper drive shaft 140, neither the cog 103 nor the upper drive shaft 140 can rotate independently of the other. In this manner, the differentially rotatable cog assembly 100 provides braking control to the upper drive shaft 140 and, as described above, when the upper drive shaft 140 is coupled through the coupler 134 to the lower drive shaft 46, and to the jack leg. Accordingly, operation of the cam member 54 to disengage the upper drive shaft 140 from the lower drive shaft 46 releases the lower drive shaft 46v from the braking control exerted by the differentially rotatable cog assembly 100 and permits the jack leg 20 to be rapidly lowered to the ground. Operation of the cam member 54 also permits the lower drive shaft 46 to be driven by the hand cranking system while the upper drive shaft 140 remains braked. The compartment 107 is preferably provided with a cover 109 such that the compartment can be closed both to protect the differentially rotatable cog assembly 100 and to provide an appealing appearance when the compartment is positioned on a jack housing 116 of a camper jack system.

As described above, the differentially rotatable cog assembly 100 is preferably adapted to remain immovable against a force applied to the upper drive shaft of up to about 300 lbs. At forces greater than about 300 lbs., however, the pivotally anchored pinion 105 will pivot just enough to allow the cog 103 to rotate. The star-shaped configuration of the cog 103 results in each star leg catching, at least momentarily, as the pinion 105 is contacted while the cog 103 rotates. The cog 103 and pinion 105 are constructed to provide the desired property of remaining engaged under forces up to the selected force and being movable under greater forces. In particular, the thickness and, thus, the strength and resilience of the material used in the differentially rotatable cog assembly 100 is adjusted to provide the resistance to rotation up to a selected force and, then, to provide for rotation when the force exceeds the selected force. Suitable materials, e.g., moldable nylon and plastic materials, are known in the art, and include very strong but resilient nylon or plastic materials.

Because the differentially rotatable cog assembly 100 can withstand forces up to the selected force, preferably about 300 lbs., the upper drive shaft 140, and thus the lower drive shaft 46 and the jack leg 20, remain safely braked during normal vibration and jolting and jarring and, especially, the normal vibration and bouncing and bumping that occurs during travel of the truck equipped with the camper jack system. Operation of the hand cranking system or other driving mechanism, however, easily generates sufficient rotating force upon the lower drive shaft 46 and, thus, upon the upper drive shaft 140 coupled through the coupler 134 to the lower drive shaft 46, to overcome the resistance of the differentially rotatable cog assembly 100 such that the cog 103 rotates along with the coupled upper and lower drive shafts 140 and 46, respectively. Thus, if an operator fails to operate the cam member 54 to release the braking control of the cog assembly 100 on the upper drive shaft 140 before operating the hand crank, no damage will occur to any of the components of the mechanical braking mechanism or the quick-release arrangement. This rotation of the cog 103, however, results in some discernible resistance to cranking and also an audible clicking noise as each star leg contacts the pinion 105. In this manner, the operator is made aware that the upper drive shaft 140 is still engaged with the lower drive shaft 46 through the coupler 134.

Although motorized camper jack systems are advantageous in many ways, it may sometimes be desired or necessary to override the motor operation of the camper jack system and operate the camper jack manually. For example, the motor may be malfunctioning or power may not be available or is preferably not utilized. Thus, it has been considered desirable to provide camper jack systems that can optionally be operated either manually or with a motor. Camper jack systems of this type are manufactured by Happijac Corporation, Kaysville, Utah. These camper jack systems utilize a ball screw and ball nut mechanism which can be operated either with an attachable hand crank or an attachable motor. It will be appreciated that the quick-release arrangement of the present invention can perform dual functions in these type of camper jack systems. The quick-release arrangement effects release of the jack leg from the braking control of the motor to permit rapid lowering of the jack leg to the ground and, at the same time, the quick-release arrangement also permits the motor to be disengaged from driving control of the lower drive shaft such that the optional manual cranking system can be used to drive the lower drive shaft when that is desired.

It will be appreciated that the present invention may be embodied in other specific forms without departing from its spirit or essential characteristics. The described embodiments are to be considered in all respects only as illustrative and not restrictive, and the scope of the invention is indicated by the appended claims rather than by the foregoing description. All changes which come within the meaning and range of equivalency of the claims are to be embraced within their scope.

What is claimed and desired to be secured by United States Patent is:

1. A quick-release arrangement for a camper jack system, said camper jack system comprising an exterior jack housing, a jack leg telescopically received within said jack housing, an elongated screw threaded through a nut non-rotatably attached to the jack leg, and a driving mechanism coupled to the screw to effect rotation thereof resulting in travel of the nut along the screw to thereby extend or retract the jack leg relative to said jack housing, said quick-release arrangement comprising:

(a) a cam member disposed within said jack housing, said cam member being supported at a pivot axis within said jack housing, said cam member having a support surface and an adjacent cam surface, said cam surface being farther from said pivot axis than said support surface, said cam member pivotal between having the cam surface oriented upwardly and having the support surface oriented upwardly;

(b) a coupler disposed within said jack housing and being supported on the upwardly oriented surface of said cam member, said coupler having a bore therethrough for slidably engaging a braked upper drive shaft and for slidably engaging a lower drive shaft, said lower drive shaft being coupled to said screw such that rotation of said lower drive shaft effects rotation of said screw to thereby effect movement of said jack leg; and (c) a spring positioned and tensioned to bias said coupler downwardly into engagement with said lower drive shaft;

wherein, when said coupler is supported by said support surface of said cam member, said braked upper drive shaft and said lower drive shaft are engaged to thereby brake said jack leg and, when said coupler is supported by said cam surface of said cam member, said braked upper drive shaft and said lower drive shaft are disengaged to thereby release said jack leg from being braked.

2. The quick-release arrangement for a camper jack system described in claim 1 further comprising a cam lever accessible on the jack housing for selectively pivoting said cam member.

3. The quick-release arrangement for a camper jack system described in claim 1 wherein the cam surface slopes downwardly toward the support surface.

4. The quick-release arrangement for a camper jack system described in claim 1 wherein a lower end of said coupler and an upper end of said lower drive shaft have bevelled surfaces to facilitate engagement.

5. The quick-release arrangement for a camper jack system described in claim 1 wherein said upper drive shaft is braked by a motor.

6. The quick-release arrangement for a camper jack system described in claim 1 wherein said upper drive shaft is braked by a mechanical braking mechanism.

7. The quick-release arrangement for a camper jack system described in claim 6 wherein said mechanical braking mechanism comprises a differentially rotatable cog assembly.

8. A quick-release arrangement for a camper jack system comprising:

(a) a cam member supported at a pivot axis within a camper jack housing, said cam member having a support surface and an adjacent cam surface, said cam surface being farther from said pivot axis than said support surface, said cam member pivotal between having the cam surface oriented upwardly and having the support surface oriented upwardly;

(b) a coupler, supported within said jack housing on the upwardly oriented surface of the cam member; and (c) a spring positioned and tensioned to bias said coupler downwardly;

wherein, when said coupler is supported by said support surface of said cam member, said coupler is supported in a position that is higher within said jack housing than when said coupler is supported by said cam surface of said cam member.

9. The quick-release arrangement for a camper jack system described in claim 8 further comprising a cam lever accessible on the jack housing for selectively pivoting said cam member.

10. The quick-release arrangement for a camper jack system described in claim 8 wherein the cam surface slopes downwardly toward the support surface.

11. A quick-release arrangement for a motorized camper jack system, said motorized camper jack system comprising an exterior jack housing, a jack leg telescopically received within said jack housing, an elongated screw threaded through a nut non-rotatably attached to the jack leg, and a motor coupled to the screw to effect rotation thereof resulting in travel of the nut along the screw to thereby extend or retract the jack leg relative to said jack housing, said quick-release arrangement comprising:

(a) a cam member disposed within said jack housing, said cam member being supported at a pivot axis within said jack housing, said cam member having a support surface and an adjacent cam surface, said cam surface being farther from said pivot axis than said support surface, said cam member pivotal between having the cam surface oriented upwardly and having the support surface oriented upwardly;

(b) a coupler disposed within said jack housing and being supported on the upwardly oriented surface of said cam member, said coupler having a bore therethrough for slidably engaging an upper drive shaft and a lower drive shaft, said upper drive shaft being coupled to said motor such that said motor provides both braking and driving control to said upper drive shaft and said lower drive shalt being coupled to said screw such that rotation of said lower drive shaft effects rotation of said screw to thereby effect movement of said jack leg; and (c) a spring positioned and tensioned to bias said coupler downwardly into engagement with said lower drive shaft;

wherein, when said coupler is supported by said support surface of said cam member, the upper drive shaft and lower drive shaft are engaged to thereby drive and brake said jack leg under control of said motor and, when said coupler is supported by said cam surface of said cam member, the upper drive shaft and lower drive shaft are disengaged to thereby release said jack leg from braking and driving control of said motor.

12. The quick-release arrangement for a motorized camper jack system described in claim 11 further comprising a cam lever accessible on the jack housing for selectively pivoting said cam member.

13. The quick-release arrangement for a motorized camper jack system described in claim 11 wherein the cam surface slopes downwardly toward the support surface.

14. The quick-release arrangement for a motorized camper jack system described in claim 11 wherein a lower end of said coupler and an upper end of said lower drive shaft have bevelled surfaces to facilitate engagement.

15. A quick-release arrangement for a camper jack system, said camper jack system comprising an exterior jack housing, a jack leg telescopically received within said jack housing, an elongated screw threaded through a nut non-rotatably attached to the jack leg, and a driving mechanism coupled to the screw to effect rotation thereof resulting in travel of the nut along the screw to thereby extend or retract the jack leg relative to said jack housing, said quick-release arrangement comprising:

(a) a cam member disposed within said jack housing, said cam member being supported at a pivot axis within said jack housing, said cam member having a support surface and an adjacent cam surface, said cam surface being farther from said pivot axis than said support surface, said cam member pivotal between having the cam surface oriented upwardly and having the support surface oriented upwardly;

(b) a coupler disposed within said jack housing and being supported on the upwardly oriented surface of said cam member, said coupler having a bore therethrough for slidably engaging an upper drive shaft and a lower drive shaft, said upper drive shaft being coupled to a mechanical braking mechanism and said lower drive shaft being coupled to said screw such that rotation of said lower drive shaft effects rotation of said screw to thereby effect movement of said jack leg; and (c) a spring positioned and tensioned to bias said coupler downwardly into engagement with said lower drive shaft;

wherein, when said coupler is supported by said support surface of said cam member, the upper drive shaft and lower drive shaft are engaged to thereby brake said jack leg and, when said coupler is supported by said cam surface of said cam member, the upper drive shaft and lower drive shaft are disengaged to thereby release said jack leg from being braked by the mechanical braking mechanism.

16. The quick-release arrangement for a camper jack system described in claim 15 wherein said mechanical braking mechanism comprises a differentially rotatable cog assembly.

17. The quick-release arrangement for a camper jack system described in claim 16 wherein said differentially rotatable cog assembly comprises a cog engaged with a pivotally anchored pinion.

18. The quick-release arrangement for a camper jack system described in claim 17 wherein said cog engaged with a pivotally anchored pinion is adapted to remain immovable against a selected force applied to the upper drive shaft.

* * * * *